US012769275B2

(12) United States Patent
Shamoto

(10) Patent No.: US 12,769,275 B2
(45) Date of Patent: Oct. 20, 2026

(54) POSITIONAL RELATIONSHIP MEASUREMENT METHOD AND MACHINING APPARATUS

(71) Applicant: National University Corporation Tokai National Higher Education and Research System, Aichi-ken (JP)

(72) Inventor: Eiji Shamoto, Aichi-ken (JP)

(73) Assignee: National University Corporation Tokai National Higher Education and Research System, Nagoya (JP)

( * ) Notice: Subject to any disclaimer, the term of this patent is extended or adjusted under 35 U.S.C. 154(b) by 730 days.

(21) Appl. No.: 18/156,164

(22) Filed: Jan. 18, 2023

(65) Prior Publication Data

US 2023/0152772 A1 May 18, 2023

Related U.S. Application Data

(63) Continuation of application No. PCT/JP2021/011349, filed on Mar. 19, 2021.

(51) Int. Cl.
*G05B 19/18* (2006.01)

(52) U.S. Cl.
CPC .. *G05B 19/182* (2013.01); *G05B 2219/37087* (2013.01)

(58) Field of Classification Search
CPC ...... G05B 19/4086; G05B 2219/35557; G05B 2219/50049; G05B 19/182
See application file for complete search history.

(56) References Cited

U.S. PATENT DOCUMENTS 4,382,215 A 5/1983 Barlow et al.
2006/0247817 A1 11/2006 Otsuki et al.
2009/0093905 A1 * 4/2009 Otsuki ............... G05B 19/4086 700/174

FOREIGN PATENT DOCUMENTS

JP 58120109 A * 7/1983
JP S61109646 A 5/1986
JP H10301609 A 11/1998
JP 2001105281 A 4/2001
JP 2006289524 A 10/2006
JP 2010218174 A 9/2010
JP 2017196701 A 11/2017
JP 2018045727 A 3/2018
(Continued)

OTHER PUBLICATIONS

International Search Report PCT/ISA/210 dated Jun. 8, 2021 from corresponding PCT Application PCT/JP2021/011349, with English translation, 5 pages.

(Continued)

*Primary Examiner* — Lam S Nguyen
(74) *Attorney, Agent, or Firm* — Muncy, Geissler, Olds & Lowe, P.C.

(57) ABSTRACT

A control device moves a cutting tool relative to a workpiece to bring the workpiece and the cutting tool into contact with each other, and acquires a coordinate value of a reference point when the workpiece and the cutting tool come into contact with each other. The control device derives an error between the coordinate value thus acquired and a design coordinate value of the reference point at a position where the workpiece and the cutting tool come into contact with each other, and outputs information on the error.

2 Claims, 16 Drawing Sheets

(56) References Cited

FOREIGN PATENT DOCUMENTS

| | | | |
|---|---|---|---|
| KR | 101552879 | B1 | 9/2015 |
| WO | 2020174585 | A1 | 9/2020 |

OTHER PUBLICATIONS

Written Opinion PCT/ISA/237 dated Jun. 8, 2021 from corresponding PCT Application PCT/JP2021/011349, with English translation, 10 pages.

Office Action dated Aug. 9, 2022 from corresponding JP Application 2022-517195, with English translation, 11 pages.

Office Action dated Feb. 14, 2023 from corresponding JP Application 2022-517195, with English translation, 9 pages.

An Office Action in corresponding CN Application No. 202180044323.9 dated Feb. 24, 2026.

* cited by examiner

POSITIONAL RELATIONSHIP MEASUREMENT METHOD AND MACHINING APPARATUS

CROSS REFERENCE TO RELATED APPLICATIONS

This application is based upon and claims the benefit of priority from International Application No. PCT/JP2021/011349, filed on Mar. 19, 2021, the entire contents of which are incorporated herein by reference.

BACKGROUND

1. Field of the Disclosure

The present disclosure relates to a technique for enabling a machining apparatus to perform cutting with high accuracy.

2. Description of the Related Art

In machining, a workpiece (also referred to as a work object or a work) is secured to a table or a spindle of a machining apparatus, a cutting tool is secured to a tool post (turret) or the spindle, and shape creation is performed by relative movement between the workpiece and the cutting tool. When a fixing position of the workpiece relative to the cutting tool and/or a surface shape of the workpiece deviate from a corresponding design value by an allowable error or more, planned machining cannot be performed, and an unmachined portion may remain, or conversely, the cutting tool may be damaged due to machining by a depth of cut greater than a design depth. It is therefore necessary to perform preparation work (setup) in which a relative positional relationship between the workpiece and the cutting tool is measured before machining.

The following is an example of the setup performed before machining.

(1) Measurement of Z-Direction Position of Workpiece Reference Surface

A position of a workpiece reference surface (upper surface of the workpiece when a rotary spindle is a vertical spindle) in a Z direction (axial direction of the rotary spindle) is measured using a tool setter. For example, the tool setter that detects contact is disposed on the upper surface of the workpiece secured onto a work table, and a tool tip (a tool tip position relative to a machine reference point is separately measured) is brought into contact with an upper surface of the tool setter (a height of the tool setter is known), so that a Z-direction position of the workpiece reference surface relative to the machine reference point is measured.

(2) Measurement of XY-Direction Position of Workpiece Origin

X-axis direction and Y-axis direction (directions orthogonal to the axial direction of the rotary spindle) positions of an origin of a work coordinate system of the workpiece are measured using a touch sensor. For example, the X-axis direction position and the Y-axis direction position of the workpiece origin relative to the machine reference point are measured by bringing the touch sensor having a known stylus diameter into contact with the workpiece in the X-axis direction and the Y-axis direction.

A technique for detecting contact between a workpiece and a cutting tool without using a sensor such as a tool setter has been proposed recently. WO 2020/174585 A discloses a technique for specifying a contact position between a cutting tool and a workpiece from a first time-series data of detection values related to a drive motor acquired before contact and a second time-series data of detection values related to the drive motor acquired after the contact. The contact between the cutting tool and the workpiece is specified by using a regression equation obtained by regression analysis of the second time-series data.

for the setup in the relater art, the relative positional relationship between the position of the cutting edge of the tool and the workpiece is measured using a sensor such as a dedicated tool setter, but it takes time to attach the sensor, and taking into consideration an attachment error of the sensor, it cannot be said that the measurement accuracy is high. Further, when the fixing position of the workpiece is shifted in the rotation direction about the ABC axis, or when the surface shape of the workpiece deviates from a planned shape (design shape), planned machining cannot be performed even when the setup in the related art is performed for a long time. This may cause an unmachined portion to remain, or conversely, an increase in the machining amount more than planned to cause tool wear to progress, thereby causing an increase in surface roughness or deterioration in machining accuracy.

SUMMARY

The present disclosure has been made in view of such circumstances, and it is therefore an object of the present disclosure to provide a technique for enabling a machining apparatus to perform cutting with high accuracy.

In order to solve the above-described problems, one aspect of the present disclosure is a positional relationship measurement method for measuring a relative positional relationship between a workpiece and a tool, the method including moving the tool relative to the workpiece to bring the workpiece and the tool into contact with each other, acquiring a coordinate value of a reference point when the workpiece and the tool come into contact with each other, deriving an error between the coordinate value acquired and a design coordinate value of the reference point at a position where the workpiece and the tool come into contact with each other, and outputting information on the error.

Another aspect of the present disclosure is a machining apparatus including a rotation mechanism structured to rotate a spindle to which a tool is attached, a feed mechanism structured to move the tool relative to a workpiece, and a control device structured to control rotation of the spindle by the rotation mechanism and relative movement of the tool by the feed mechanism. The control device moves the tool relative to the workpiece to acquire a coordinate value of a reference point when the workpiece and the tool come into contact with each other, derives an error between the coordinate value thus acquired and a design coordinate value of the reference point at a position where the workpiece and the tool come into contact with each other, and outputs information on the error.

Note that any combination of the above-described components, or an entity that results from replacing expressions of the present disclosure among a method, an apparatus, a system, a recording medium, a computer program, and the like is also valid as an aspect of the present disclosure.

DETAILED DESCRIPTION

The disclosure will now be described by reference to the preferred embodiments. This does not intend to limit the scope of the present disclosure, but to exemplify the disclosure.

Figure 1:
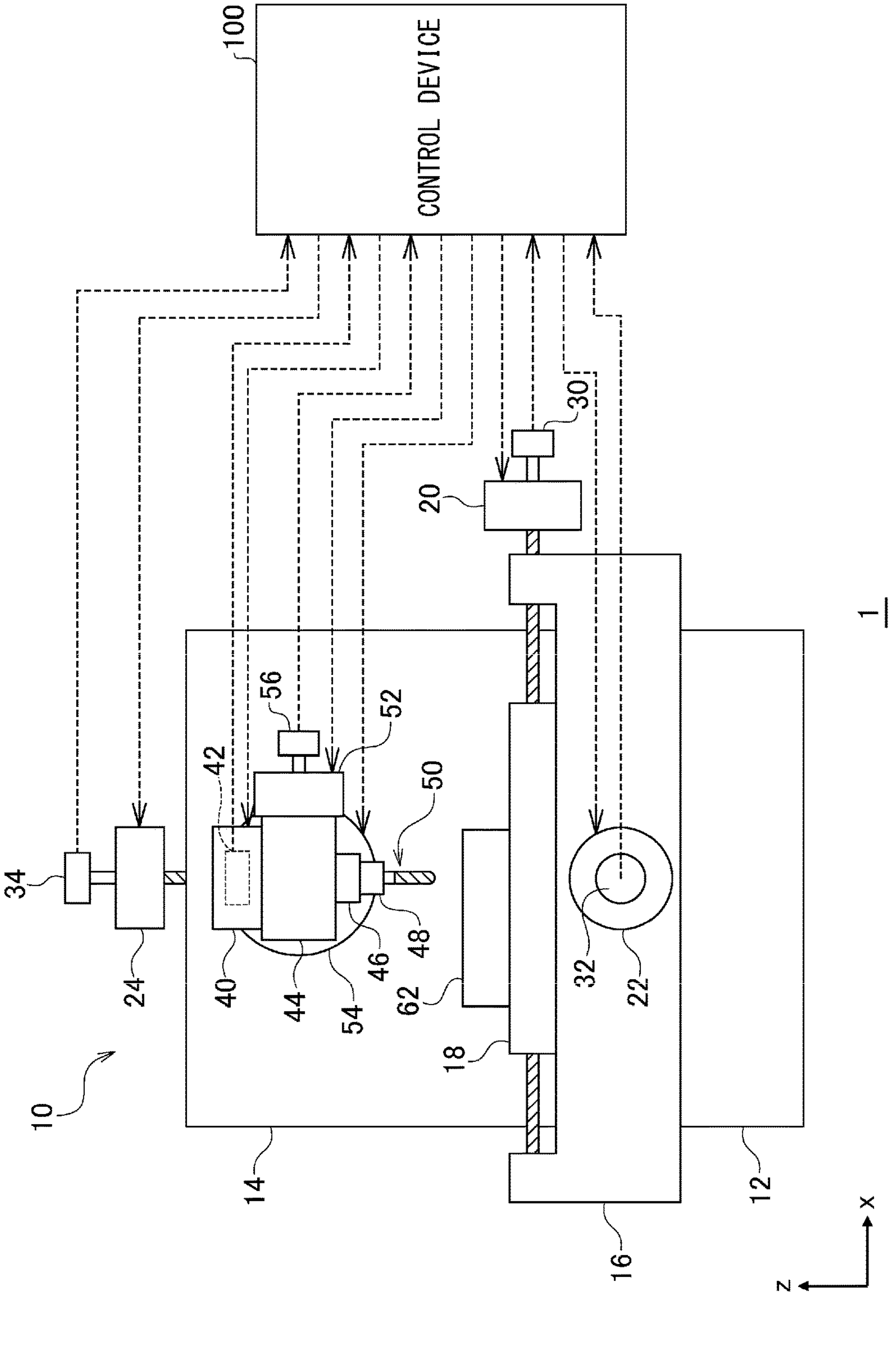
FIG. 1 is a diagram showing a schematic structure of a machining apparatus according to an embodiment.

FIG. 1 is a diagram showing a schematic structure of a machining apparatus 1 according to an embodiment. The machining apparatus 1 includes a machine tool 10 and a control device 100. The control device 100 may be a numerical control (NC) control device that controls the machine tool 10 in accordance with an NC program, and the machine tool 10 may be an NC machine tool controlled by the NC control device. In the machining apparatus 1, the machine tool 10 and the control device 100 are separate from each other and connected by a cable or the like, or alternatively may be inseparable from each other.

The machine tool 10 includes a bed 12 and a column 14 that make up a body. On the bed 12, a first table 16 and a second table 18 are supported in a movable manner. The first table 16 is supported by a rail provided on the bed 12 so as to be movable in a Y-axis direction, and the second table 18 is supported by a rail provided on the first table 16 so as to be movable in an X-axis direction. Provided on an upper surface of the second table 18 is a workpiece installation surface, and a workpiece 62 to be machined is secured to the workpiece installation surface.

A Y-axis motor 22 rotates a ball screw mechanism to move the first table 16 in the Y-axis direction, and an X-axis motor 20 rotates a ball screw mechanism to move the second table 18 in the X-axis direction. A Y-axis sensor 32 detects a position of the first table 16 in the Y-axis direction, and an X-axis sensor 30 detects a position of the second table 18 in the X-axis direction.

Provided above the second table 18 is a spindle 46 to which a cutting tool 50 is attached. A spindle motor 40 serves as rotation mechanism that rotates the spindle 46, and a spindle sensor 42 detects a rotation speed of the spindle motor 40. Note that the rotation mechanism may include a speed reduction mechanism including a plurality of gears. The spindle 46 and the spindle motor 40 are supported by a spindle support 44. According to the embodiment, a holder 48 is secured to the spindle 46, and an end mill tool that is the cutting tool 50 is attached to the holder 48.

The spindle support 44 has a back surface supported by a rail provided on the column 14 so as to be movable in a Z-axis direction. A Z-axis motor 24 rotates a ball screw mechanism to move the spindle 46 in the Z-axis direction. A Z-axis sensor 34 detects a position of the spindle 46 in the Z direction.

A first tilt motor 52 rotates a gear mechanism to tilt the spindle support 44 about an axis orthogonal to the axis of the spindle 46 and the Y axis. A tilt sensor 56 detects an angle of the spindle 46 tilted by the first tilt motor 52. A second tilt motor 54 rotates a gear mechanism to tilt the spindle support 44 about an axis parallel to the Y axis. A tilt sensor (not shown) different from the tilt sensor 56 detects an angle of the spindle 46 tilted by the second tilt motor 54. The machine tool 10 may include a third tilt motor (not shown) that tilts the spindle support 44 about a C axis.

The control device 100 drives and controls the X-axis motor 20, the Y-axis motor 22, the Z-axis motor 24, the first tilt motor 52, the second tilt motor 54, and the spindle motor 40 in accordance with the NC program. The control device 100 acquires respective detection values detected by the X-axis sensor 30, the Y-axis sensor 32, the Z-axis sensor 34, the tilt sensors, and the spindle sensor 42 and applies each of the detection values to drive control of a corresponding motor.

In the machine tool 10 shown in FIG. 1, the workpiece 62 is moved in the X-axis direction and the Y-axis direction by the X-axis motor 20 and the Y-axis motor 22, and the cutting tool 50 is moved in the Z-axis direction by the Z-axis motor 24, but such movements may be relative movements between the cutting tool 50 and the workpiece 62. That is, in the machine tool 10, the cutting tool 50 may be moved in the X-axis direction and the Y-axis direction, and the workpiece 62 may be moved in the Z-axis direction. In the machine tool 10, the cutting tool 50 is tilted by the first tilt motor 52 and the second tilt motor 54 relative to the workpiece 62, but such tilt motors may be provided in the bed 12.

As described above, it is not important which of the cutting tool 50 and the workpiece 62 is moved as long as the relative movement in each movement direction and each rotation direction is enabled. Mechanisms for enabling the relative movement between the cutting tool 50 and the workpiece 62 are hereinafter collectively referred to as a "feed mechanism". The control device 100 controls the rotation mechanism for the rotation of the spindle 46 and controls the feed mechanism for the relative movement of the cutting tool 50.

The control device 100 according to the embodiment has a function of measuring a relative positional relationship between the workpiece 62 and a tool attached to the spindle 46. The control device 100 may output information on a position error in a translation direction and/or information on a position error in the rotation direction of the machine tool 10 on the basis of the positional relationship thus measured. Further, the control device 100 may output information on a shape error of the workpiece 62 on the basis of the measured relative positional relationship.

According to the embodiment, the tool attached to the spindle 46 is an end mill tool, but a cutting tool 50 of a different type may be attached to the spindle 46. Note that the tool attached to the spindle 46 may be a tool having no cutting ability, that is, a dummy tool having no cutting edge.

Figure 2:
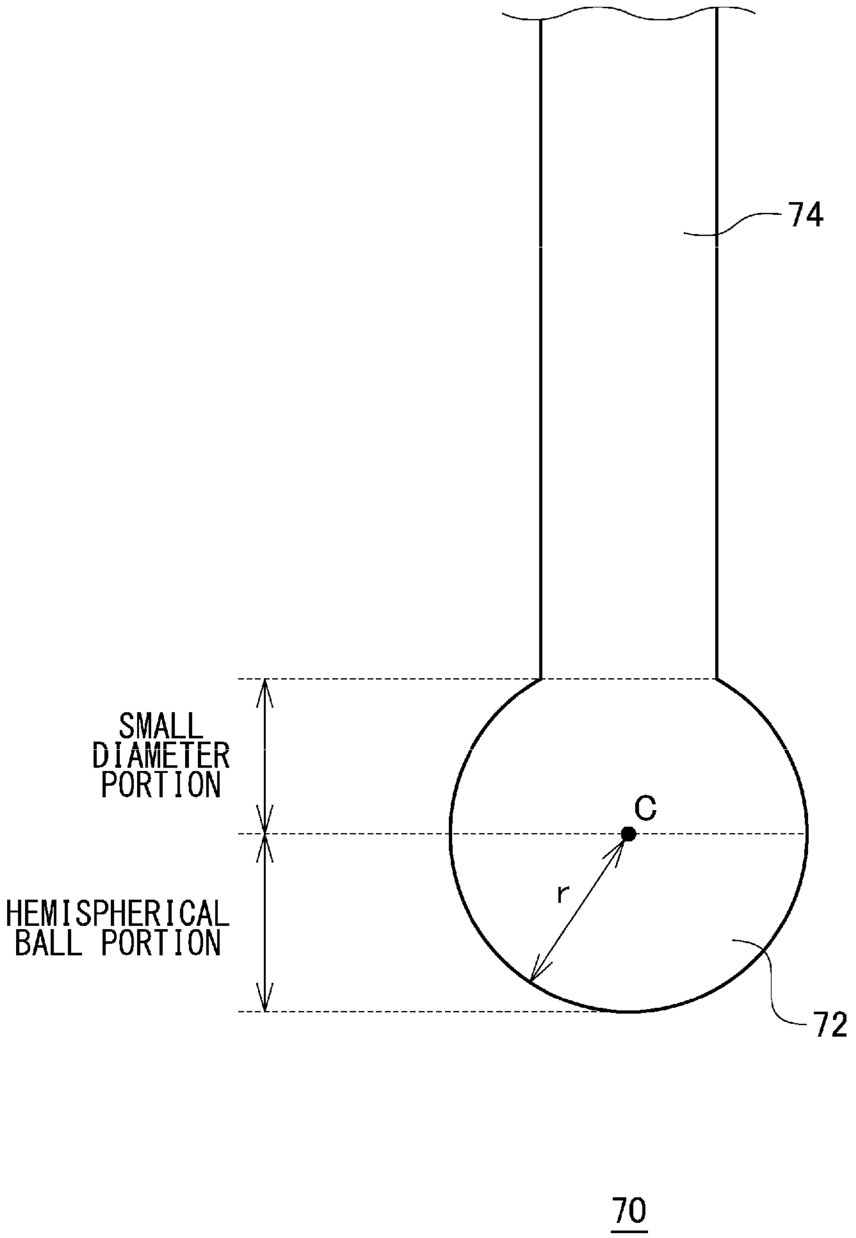
FIG. 2 is a diagram showing an example of a shape of a tip of a dummy tool.

FIG. 2 shows example of a shape of a tip of a dummy tool. A dummy tool 70 includes a spherical portion 72 having a center c and a cylindrical portion 74 connected to the spherical portion 72, but has no cutting edge. The spherical portion 72 is a spherical component having a spherical shape, and includes a hemispherical ball portion serving as a lower side and a small diameter portion connected to the ball portion. The center c of the spherical portion 72 is located on a center axis of the dummy tool 70. The small diameter portion is circular in cross section orthogonal to a tool axis, and the circular cross section is smaller in radius r than the ball portion. The small diameter portion of the spherical portion 72 shown in FIG. 2 has a hemispherical shape having a radius r with a top side removed along a plane orthogonal to the axis, and the cylindrical portion 74 is connected to a surface obtained as a result of removing the top side.

A description will be given below of a method for measuring the relative positional relationship between the workpiece 62 and the cutting tool 50 by bringing the cutting edge of the cutting tool 50 into contact with the workpiece 62. During the measurement of the positional relationship, the cutting tool 50 may be rotated by the spindle 46. Note that, instead of the cutting tool 50, the dummy tool 70 may be used for measuring the relative positional relationship between the workpiece 62 and the dummy tool 70 by bringing the dummy tool 70 into contact with the workpiece 62, but at this time, the dummy tool 70 may be brought into contact with the workpiece 62 with the dummy tool 70 not rotating.

Figure 3:
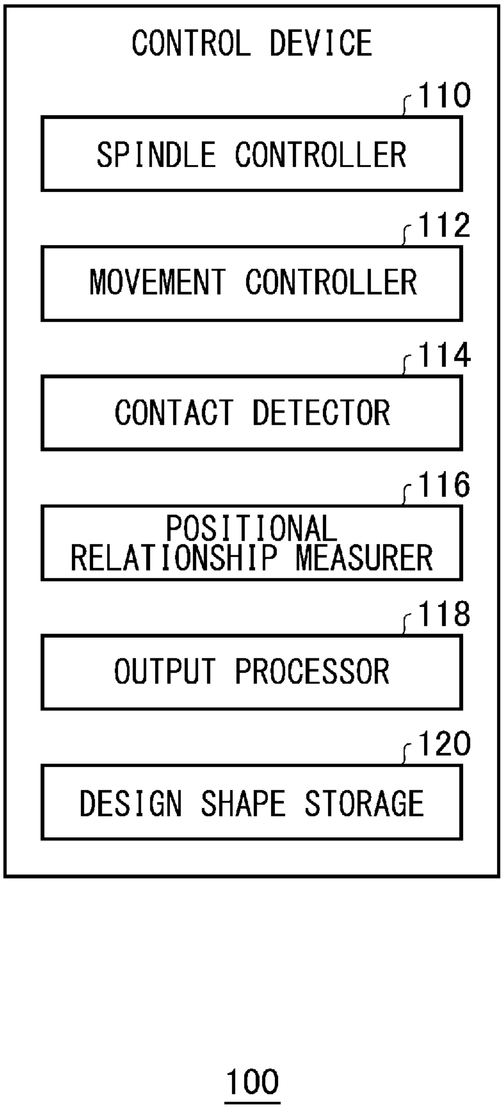
FIG. 3 is a diagram showing functional blocks of a control device.

FIG. 3 shows functional blocks of the control device 100. The control device 100 includes a spindle controller 110, a movement controller 112, a contact detector 114, a positional relationship measurer 116, an output processor 118, and a design shape storage 120. The spindle controller 110 controls the rotation mechanism for the rotation of the spindle 46, and the movement controller 112 controls the feed mechanism for the relative movement between the cutting tool 50 and the workpiece 62. The design shape storage 120 may store three-dimensional shape data defining the design shape of the workpiece 62, but may store a part of the three-dimensional shape data in order to reduce the data volume. Specifically, the design shape storage 120 may store three-dimensional coordinate values of the workpiece surface having an ideal surface shape planned (designed) as a premachined surface, but may store three-dimensional coordinate values of a part of the workpiece surface.

As described later, in the example, the positional relationship measurer 116 derives an error between a coordinate value (measured coordinate value) of a tool reference point measured when the cutting tool 50 and the workpiece 62 are brought into contact with each other and a coordinate value (design coordinate value) at which the tool reference point is intended to be located. Therefore, the design shape storage 120 only needs to store information used for deriving a coordinate value of the tool reference point that is intended to be located at at least one contact position. Specifically, the design shape storage 120 may store a three-dimensional coordinate value of the workpiece surface at at least one contact position, or may store a coordinate value of the reference point that is intended to be located at at least one contact position (coordinate value obtained by adding a relative coordinate value from the contact point to the reference point of the tool to the three-dimensional coordinate value of the workpiece surface).

Note that the design shape of the workpiece 62 is a premachined surface shape before finishing, an allowable error may be set. At this time, the design shape storage 120 may store information used for deriving the design coordinate value including the allowable error. The positional relationship measurer 116 may take, using this information, a range from (design coordinate value−error allowance value) to (design coordinate value+error allowance value) as the design coordinate value and derive an error from the measured coordinate value.

In FIG. 3, each component described as a functional block that performs various processes can be implemented, in terms of hardware, by a circuit block, a memory, and another processor and implemented, in terms of software, by a program loaded on the memory and the like. Therefore, it is to be understood by those skilled in the art that these functional blocks may be implemented in various forms such as hardware only, software only, or a combination of hardware and software, and how to implement the functional blocks is not limited to any one of the above.

The contact detector 114 has a function of detecting contact between the cutting tool 50 and the workpiece 62. For example, the contact detector 114 may analyze internal information on the machining apparatus 1 that changes when the cutting tool 50 comes into contact with the workpiece 62 to detect contact between the cutting tool 50 and workpiece 62. With the machining apparatus 1 having a torque estimation capability, when the cutting tool 50 and the workpiece 62 come into contact with each other, a motor torque estimation value rapidly increases due to a load generated by the contact. Therefore, the contact detector 114 may detect, on the basis of a motor torque waveform obtained when the cutting tool 50 and the workpiece 62 come close to each other and come into contact with each other, the contact between the cutting tool 50 and the workpiece 62. At this time, the contact detector 114 may detect the contact between the cutting tool 50 and the workpiece 62 from a first time-series data of a detection value related to a drive motor acquired before the contact and a second time-series data of a detection value related to the drive motor acquired after the contact to specify the contact position.

As another aspect, the contact detector 114 may detect the contact by detecting continuity established when the cutting tool 50 and the workpiece 62 come into contact with each other to specify the detection position. Further, the contact detector 114 may take an image of a chip or a cutting mark generated when the cutting tool 50 cuts the workpiece 62 with a camera and analyze the image thus taken to detect the contact to specify the contact position. As described above, the contact detector 114 preferably has a function of directly or indirectly detecting the contact between the cutting tool 50 and the workpiece 62 without using a sensor such as a tool setter between the cutting tool 50 and the workpiece 62. When detecting the contact between the cutting tool 50 and the workpiece 62, the contact detector 114 measures and acquires a coordinate value of a reference point at the time of contact. The reference point may be set at a predetermined position in the cutting tool 50, and when the cutting tool 50 is a ball end mill, the reference point may be set at the center point of the hemispherical ball portion.

The positional relationship measurer 116 measures the relative positional relationship between the cutting tool 50 and the workpiece 62 from the coordinate value (measured coordinate value) of the reference point measured at the time of contact and the coordinate value (design coordinate value) of the reference point that is intended to be located at the position where an ideal cutting tool 50 and an ideal workpiece 62 come into contact with each other. Here, the ideal cutting tool 50 means a tool having a set shape and disposed at a set attachment position. The ideal workpiece 62 means a workpiece having a designed surface shape and disposed at a predetermined attachment position.

When the measured coordinate value and the design coordinate value coincide with each other, there is no position error between the workpiece 62 and the cutting tool 50 at the contact position. On the other hand, when the measured coordinate value does not coincide with the design coordinate value, the positional relationship measurer 116 derives an error (difference) between the measured coordinate value and the design coordinate value as the relative positional relationship. At this time, the positional relationship measurer 116 may derive a position error in a relative movement direction at the time of contact.

The positional relationship measurer 116 may derive, on the basis of the error thus derived, a position error in the translation direction and/or a position error in the rotation direction of the workpiece 62 relative to the cutting tool 50, and may further derive a shape error of the workpiece surface. The output processor 118 may present information on the derived error to an operator who performs the machining setup (preparation work) or may provide the information to the movement controller 112.

In the former case, the operator can manually adjust the attachment position of the workpiece 62 or set an appropriate cutting start position on the basis of the error information thus presented. In the latter case, inputting the attachment error as a work origin offset amount of each control axis of the machine tool 10 allows the movement controller 112 to automatically move the surface position of the workpiece 62 to an ideal attachment position (position where the attachment error is minimized, that is, a most desirable position), to automatically set an appropriate cutting start position, or to correct a machining shape or a machining amount in accordance with the surface shape of the workpiece 62.

In the embodiment, a description will be given of a method for identifying an attachment error of the workpiece 62 and/or a surface shape error of the workpiece 62 relative to the cutting tool 50 from a position error measured at a contact point when the cutting edge of the cutting tool 50 is brought into contact with the workpiece surface whose shape is known as a design value. Note that the shape known as the design value means a design shape when the shape of the premachined surface is defined as the design value, and means, when the shape after finishing is defined as the design value, a shape of the premachined surface obtained by adding a predetermined finishing allowance to the shape after finishing on the condition that cutting by a depth of cut less than or equal to the finishing allowance is allowed. The design shape storage 120 may store three-dimensional shape data of the premachined surface shape defined as the design value, but may store at least information used for deriving a coordinate value (design coordinate value) of the reference point that is intended to be located at at least one position where the cutting tool 50 and the workpiece 62 are brought into contact with each other.

Figure 4:
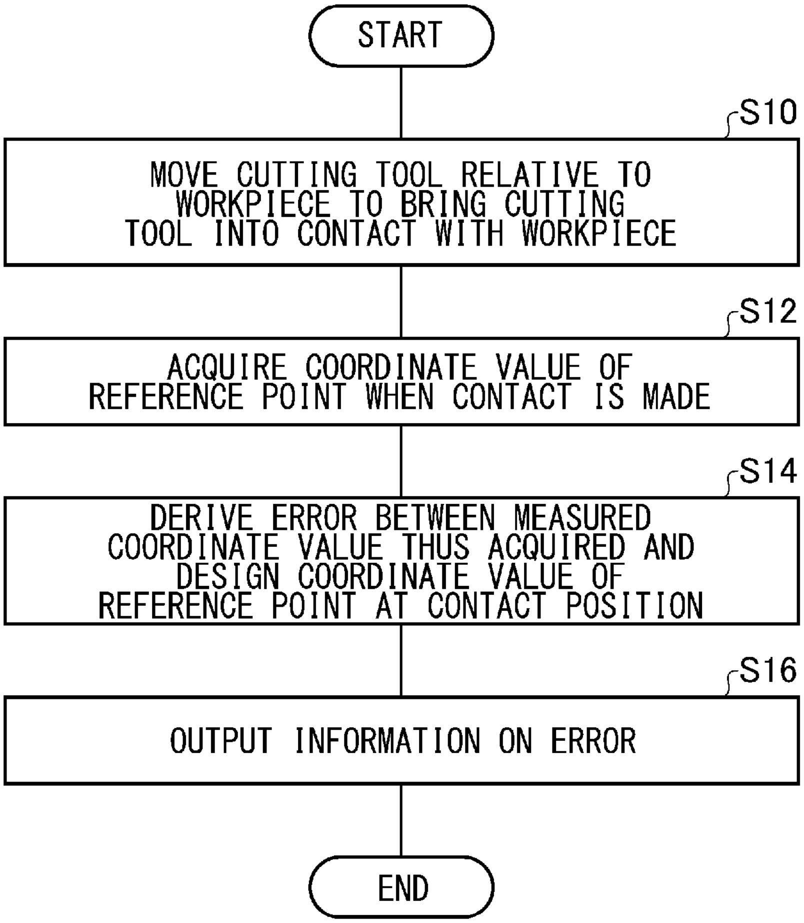
FIG. 4 is a flowchart showing an example of a procedure for measuring a relative positional relationship between a workpiece and a cutting tool.

FIG. 4 is a flowchart showing an example of a procedure for measuring the relative positional relationship between the workpiece 62 and the cutting tool 50.

First, the movement controller 112 moves the cutting tool 50 relative to the workpiece 62 to bring the cutting tool 50 and the workpiece 62 into contact with each other (S10). The contact detector 114 measures and acquires a coordinate value of the reference point when the workpiece 62 and the cutting tool 50 come into contact with each other (S12). In the embodiment, the cutting tool 50 is a ball end mill having a hemispherical ball portion, and the reference point is a center point of the hemispherical ball portion, but the reference point may be set at another position.

The positional relationship measurer 116 derives a design coordinate value of the workpiece surface at the position where the workpiece 62 and the cutting tool 50 come into contact with each other from the three-dimensional shape data stored in the design shape storage 120, and calculates a design coordinate value of the reference point of the cutting tool 50 from the design coordinate value of the workpiece surface. When the design shape storage 120 stores a coordinate value (design coordinate value) of the reference point when the cutting tool 50 comes into contact with the workpiece having the designed surface shape and placed at the predetermined attachment position, the positional relationship measurer 116 may read and acquire the design coordinate value of the reference point of the cutting tool 50 from the design shape storage 120.

The positional relationship measurer 116 derives an error between the measured coordinate value of the reference point acquired by the contact detector 114 and the design coordinate value of the reference point at the position where the workpiece 62 and the cutting tool 50 come into contact with each other (S14), and the output processor 118 outputs information on the error (S16). As described above, the output processor 118 may present the error information to the operator, or may provide the error information to the movement controller 112 as the offset amount of the origin of the work coordinate system. A specific example of the measurement method will be described below.

First Example

Figure 5:
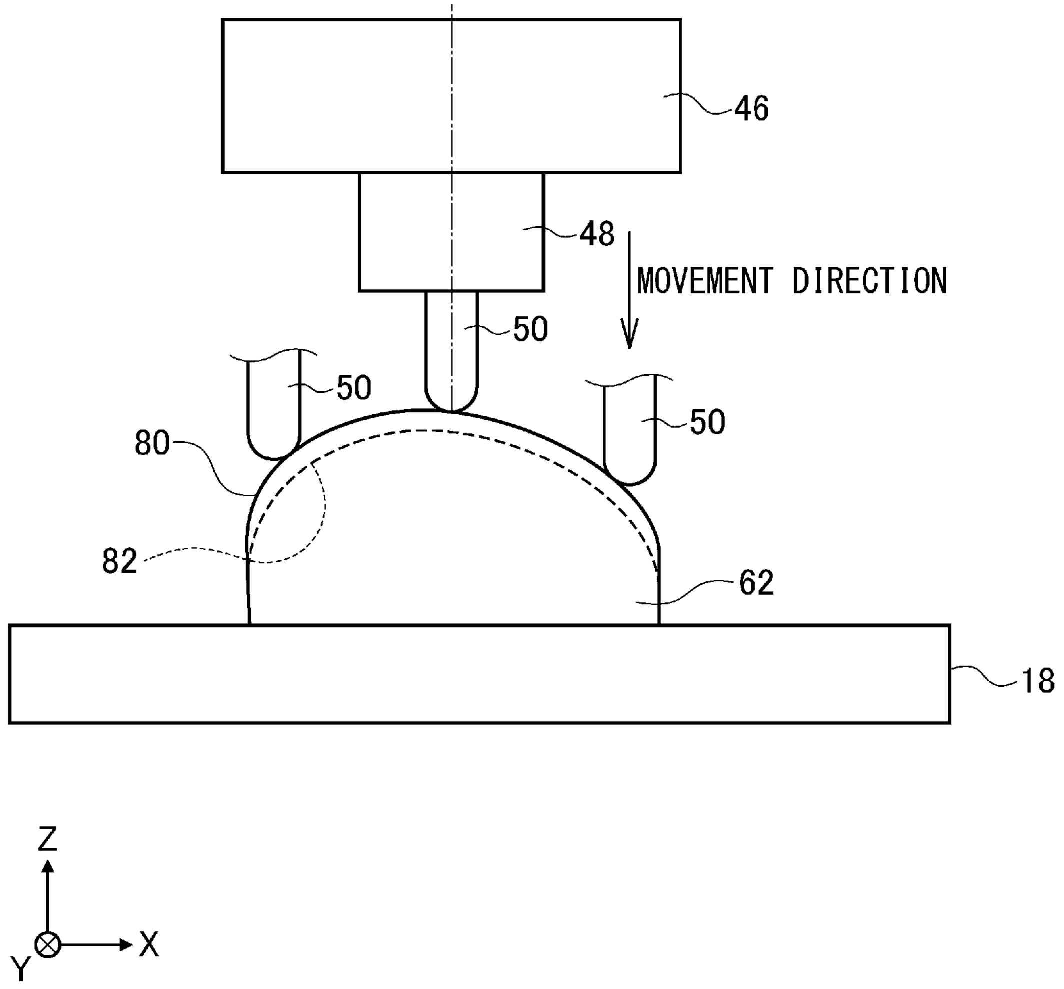
FIG. 5 is a diagram for describing an example of a measurement method.

FIG. 5 is a diagram for describing a measurement method according to a first example. A shape indicated by a solid line represents an actual surface shape 80 of the workpiece 62, and a shape indicated by a dotted line represents a design shape 82 of the workpiece 62 placed at a predetermined attachment position. In the example shown in FIG. 5, the actual surface shape 80 is formed larger than the design shape 82, but the actual surface shape 80 may be smaller than the design shape 82.

In the first example, the movement controller 112 moves the cutting tool 50 in a height direction of the workpiece 62 (Z-axis direction orthogonal to the workpiece installation surface and being one of the translation directions) to bring the cutting tool 50 into contact with the surface of the workpiece 62 at at least one designated position, and the contact detector 114 acquires the coordinate value of the reference point at the contact position. In the first example, the designated position is determined by coordinate values on orthogonal axes different from the Z-axis direction in which the movement is made, specifically, by an X-coordinate value and a Y-coordinate value.

Figure 6:
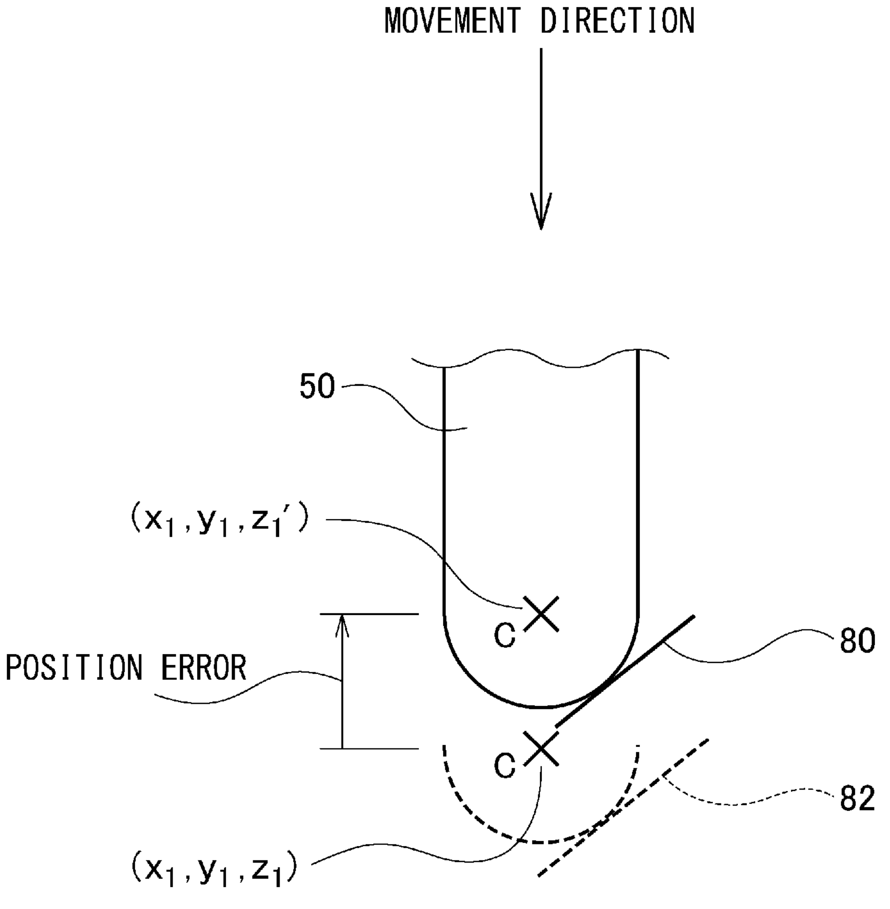
FIG. 6 is a diagram for describing an error deriving process.

FIG. 6 is a diagram for describing an error deriving process in S14. FIG. 6 shows a state where the movement controller 112 moves the cutting tool 50 in the Z-axis negative direction at a designated position ($x_1$, $y_1$) to bring the cutting tool 50 into contact with the surface of the workpiece 62. A design coordinate value of a reference point c when the cutting tool 50 comes into contact with the design shape 82 at the designated position ($x_1$, $y_1$) is ($x_1$, $y_1$, $z_1$), but the actual coordinate value of the reference point c when the cutting tool 50 comes into contact with the surface shape 80 is measured to be ($x_1$, $y_1$, $z_1'$). At this time, the positional relationship measurer 116 derives an error between the measured coordinate value and the design coordinate value as ($z_1'-z_1$).

When the movement controller 112 brings the cutting tool 50 into contact with the surface of the workpiece 62 only at one point, the output processor 118 outputs information on the position error ($z_1'-z_1$) in the height direction of the workpiece surface at the contact position. The output processor 118 may present the information on the error to the operator, or may provide the information on the error to the movement controller 112 as the offset amount from the origin of the work coordinate system.

When the movement controller 112 brings the cutting tool 50 into contact with the surface of the workpiece 62 at a plurality of positions in the same direction, the contact detector 114 measures and acquires coordinate values of the reference point when the workpiece 62 and the cutting tool 50 come into contact with each other at the plurality of positions, and the positional relationship measurer 116 derives a position error obtained by subtracting the design coordinate value of the reference point in the movement direction from the measured coordinate value in the movement direction at each of the plurality of contact positions.

At this time, the output processor 118 may output information on the smallest error among a plurality of position errors, that is, an error corresponding to the smallest value among values obtained by (measured coordinate value-design coordinate value) at the plurality of contact positions. In the embodiment, as shown in the drawings, a direction in which the cutting tool 50 moves away from the workpiece 62 is the Z-axis positive direction. When the direction in which the cutting tool 50 comes close to the workpiece 62 is the Z-axis positive direction, the output processor 118 may output information on the largest error. Outputting the information on the smallest value or the largest value of the position error makes it possible to prevent machining after error correction from leaving an unmachined portion. The output processor 118 may output a position error in the height direction at each contact position or a distribution of a plurality of position errors.

Note that the output processor 118 may output information on the largest error among the plurality of position errors, that is, an error corresponding to the largest value among values obtained by (measured coordinate value-design coordinate value) at the plurality of contact positions. When the direction in which the cutting tool 50 comes close to the workpiece 62 is the Z-axis positive direction, the output processor 118 may output information on the smallest error. Outputting the information on the largest value or the smallest value of the position error makes it is possible to set the offset amount or correct the depth of cut for the first machining process so as to prevent the depth of cut from being excessive.

When the spherical portion 72 of the dummy tool 70 that is not rotating instead of the cutting tool 50 is brought into contact with the workpiece 62, coordinate values of the reference point may be measured by bringing the spherical portion 72 into contact with the workpiece 62 a plurality of times at the same xy position but different rotation positions of the spindle 46, and an average value of the plurality of coordinate values thus measured may be obtained. This eliminates the influence of eccentricity of the dummy tool 70 relative to the spindle 46 and allows the coordinate value of the reference point to be measured with higher accuracy.

Note that, in a case where the movement controller 112 moves the cutting tool 50 relative to the workpiece 62, a maximum position error in the height direction is predefined, so that the contact position can be searched for within a range up to the maximum error.

Second Example

Figure 7:
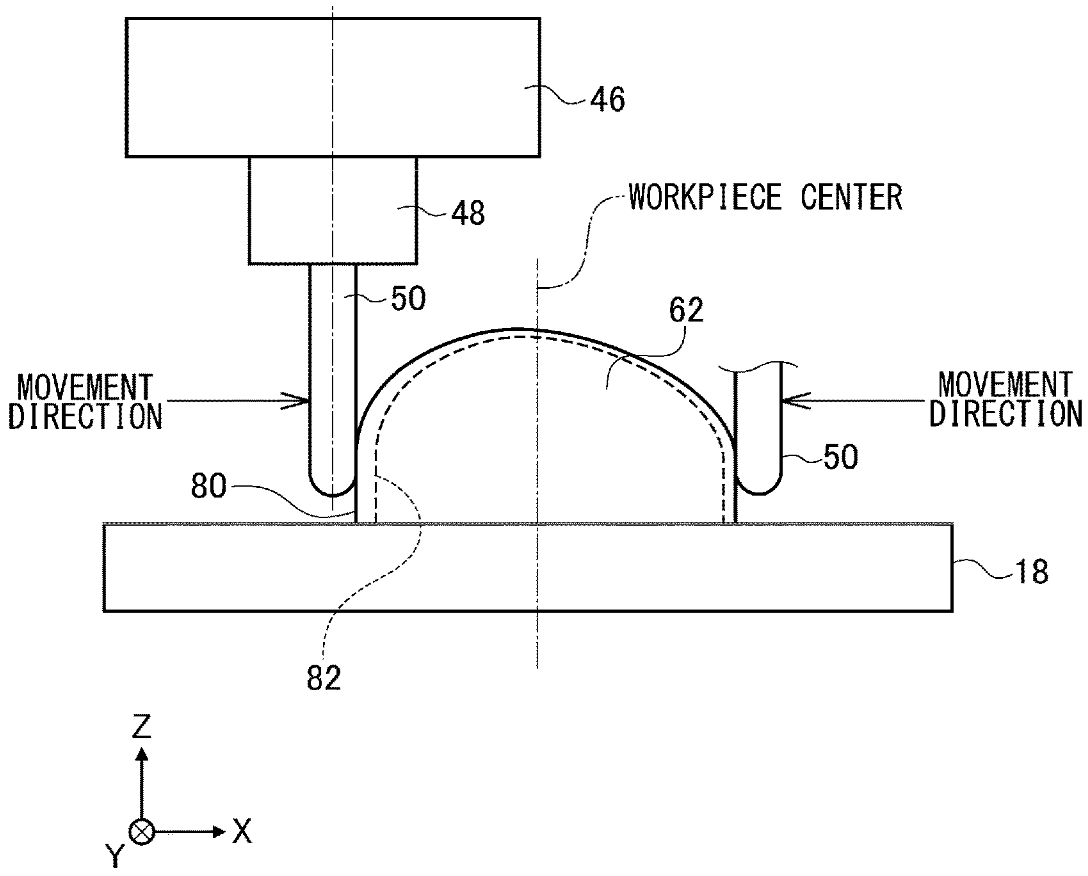
FIG. 7 is a diagram for describing an example of the measurement method.

FIG. 7 is a diagram for describing a measurement method according to a second example. A shape indicated by a solid line represents an actual surface shape 80 of the workpiece 62, and a shape indicated by a dotted line represents a design shape 82 of the workpiece 62 placed at a predetermined attachment position. In the example shown in FIG. 7, the actual surface shape 80 is formed larger than the design shape 82, but the actual surface shape 80 may be smaller than the design shape 82.

In the second example, the movement controller 112 moves the cutting tool 50 in one of the translation directions other than the height direction of the workpiece 62 (Z-axis direction) to bring the cutting tool 50 into contact with the surface of the workpiece 62 at at least one designated position, and the contact detector 114 acquires the coordinate value of the reference point at the contact position. In the example illustrated in FIG. 7, the cutting tool 50 moves in the X-axis direction, and the designated position is determined by coordinate values on orthogonal axes different from the X-axis direction, specifically, a Y-coordinate value and a Z-coordinate value.

Figure 8:
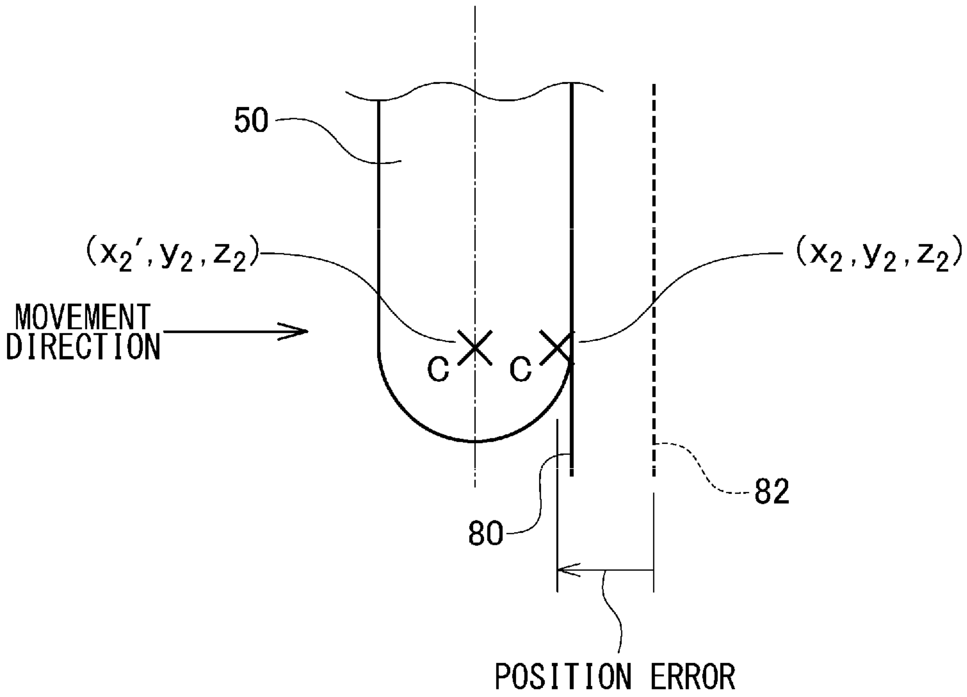
FIG. 8 is a diagram for describing an error deriving process.

FIG. 8 is a diagram for describing the error deriving process in S14. FIG. 8 shows a state where the movement controller 112 moves the cutting tool 50 in the X-axis positive direction at a designated position ($y_2$, $z_2$) to bring the cutting tool 50 into contact with the surface of the workpiece 62. A design coordinate value of a reference point c when the cutting tool 50 comes into contact with the design shape 82 at the designated position ($y_2$, $z_2$) is ($x_2$, $y_2$, $z_2$), but the actual coordinate value of the reference point c when the cutting tool 50 comes into contact with the surface shape 80 is measured to be ($x_2'$, $y_2$, $z_2$). The positional relationship measurer 116 derives an error between the measured coordinate value and the design coordinate value as ($x_2'-x_2$).

When the movement controller 112 brings the cutting tool 50 into contact with the surface of the workpiece 62 only at one point, the output processor 118 outputs information on a translation position error ($x_2'-x_2$) of the workpiece surface at the contact position. The output processor 118 may present the information on the error to the operator, or may provide the information on the error to the movement controller 112 as the offset amount from the origin of the work coordinate system.

When the movement controller 112 brings the cutting tool 50 into contact with the surface of the workpiece 62 at a plurality of positions in the same direction, the contact detector 114 measures and acquires coordinate values of the reference point when the workpiece 62 and the cutting tool 50 come into contact with each other at the plurality of positions, and the positional relationship measurer 116 derives a translation position error obtained by subtracting the design coordinate value of the reference point in the movement direction from the measured coordinate value in the movement direction at each of the plurality of contact positions.

When the movement controller 112 moves the cutting tool 50 in the X-axis positive direction to bring the cutting tool 50 into contact with the workpiece 62 at a plurality of positions, the output processor 118 may output information on the largest error among the plurality of translation position errors, that is, an error corresponding to the largest value among values obtained by (measured coordinate value–design coordinate value) at the plurality of contact positions. In the embodiment, the right direction is defined as the X-axis positive direction, and the position of the center of the workpiece is defined as an X-axis origin. On the other hand, when the movement controller 112 moves the cutting tool 50 in the X-axis negative direction to bring the cutting tool 50 into contact with the workpiece 62 at a plurality of positions, the output processor 118 may output information on the smallest error among the plurality of translation position errors, that is, an error corresponding to the smallest value among values obtained by (measured coordinate value-design coordinate value) at the plurality of contact positions. Outputting such error information makes it possible to prevent machining after error correction from leaving an unmachined portion. The output processor 118 may output a translation position error at each contact position or a distribution of a plurality of translation position errors.

Note that, for the X axis, the positional relationship measurer 116 may derive a translation position error of the entire workpiece in the X-axis direction by moving the cutting tool 50 in the X-axis positive direction to bring the cutting tool 50 into contact with the workpiece 62 at a plurality of positions and moving the cutting tool 50 in the X-axis negative direction to bring the cutting tool 50 into contact with the workpiece 62 at the same number of positions.

As described above, the translation position error at each contact position is calculated as follows:

(translation position error at each contact position) =measured coordinate value–design coordinate value.

The positional relationship measurer 116 calculates a translation position error of the entire workpiece as follows:

Translation position error of entire workpiece=Σ (translation position error at each contact position)/number of times of contact.

As described above, the positional relationship measurer 116 may calculate an average value of the position errors in the translation direction at the plurality of contact positions, and the output processor 118 may output information on the average value of the position errors.

When the spherical portion 72 of the dummy tool 70 that is not rotating instead of the cutting tool 50 is brought into contact with the workpiece 62, coordinate values of the reference point may be measured by bringing the spherical portion 72 into contact with the workpiece 62 a plurality of times at the same yz position but different rotation positions of the spindle 46, and an average value of the plurality of coordinate values thus measured may be obtained. This eliminates the influence of eccentricity of the dummy tool 70 relative to the spindle 46 and allows the coordinate value of the reference point to be measured with higher accuracy.

Note that, in a case where the movement controller 112 moves the cutting tool 50 relative to the workpiece 62, a maximum position error in the translation direction is predefined, so that the contact position can be searched for within a range up to the maximum error.

An example in which a position error in the X-axis direction is derived by moving the cutting tool 50 along the X-axis has been described above, but a position error in the Y-axis direction can be derived by moving the cutting tool 50 along the Y-axis.

Third Example

Figure 9:
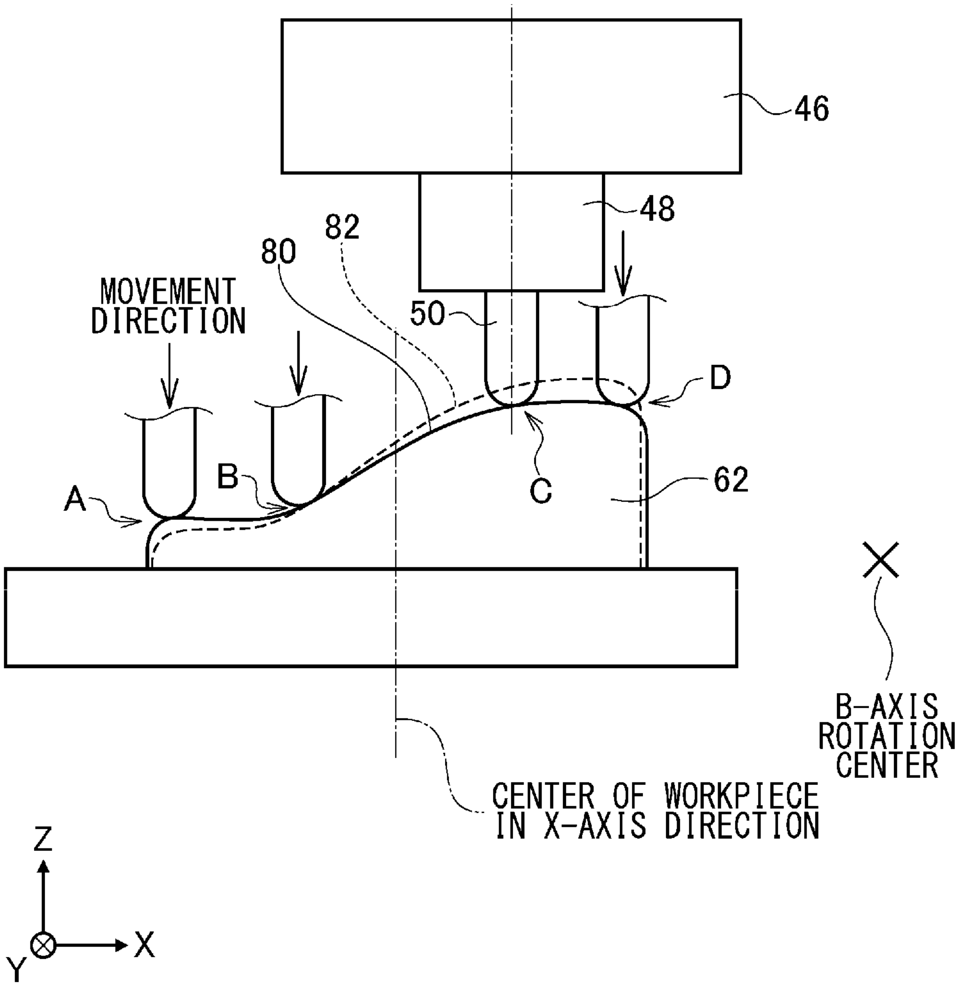
FIG. 9 is a diagram for describing an example of the measurement method.

FIG. 9 is a diagram for describing a measurement method according to a third example. A shape indicated by a solid line represents an actual surface shape 80 of the workpiece 62, and a shape indicated by a dotted line represents a design shape 82 of the workpiece 62 placed at a predetermined attachment position.

In the third example, the movement controller 112 moves and brings the cutting tool 50 into contact with the workpiece surface at a plurality of positions spaced apart from each other in one radial direction (the X-axis direction in the example shown in FIG. 9) centered on one rotation axis (the B axis in the example shown FIG. 9). At this time, the movement controller 112 moves the cutting tool 50 in a direction that is neither the radial direction (X-axis direction) nor the rotation axis direction (Y-axis direction). This movement direction is preferably a direction nearly orthogonal to the radial direction and the rotation axis direction, and is preferably the same direction as a direction in which a plurality of time of contact motion are made. In the example shown in FIG. 9, the movement controller 112 moves the cutting tool 50 in the Z-axis negative direction.

As shown in FIG. 6, the movement controller 112 moves the cutting tool 50 in the Z-axis negative direction to bring the cutting tool 50 into contact with the surface of the workpiece 62. The movement controller 112 brings the cutting tool 50 into contact with the surface of the workpiece 62 at a plurality of positions spaced apart from each other in the X-axis direction. In the example shown in FIG. 9, the movement controller 112 brings the cutting tool 50 into contact with the surface of the workpiece 62 at four positions (A to D), but may bring the cutting tool 50 into contact with the surface of the workpiece 62 at two positions, three positions, or five or more positions.

The contact detector 114 measures and acquires coordinate values of the reference point when the workpiece 62 and the cutting tool 50 come into contact with each other at a plurality of positions, and the positional relationship measurer 116 derives a position error obtained by subtracting the design coordinate value of the reference point in the workpiece height direction from the measured coordinate value in the workpiece height direction at the plurality of contact positions. The positional relationship measurer 116 may simultaneously identify a rotation position error about the rotation axis (B axis) and a translation position error in the movement direction (Z axis) of the workpiece surface on the basis of the position errors at the plurality of contact positions.

Figure 10:
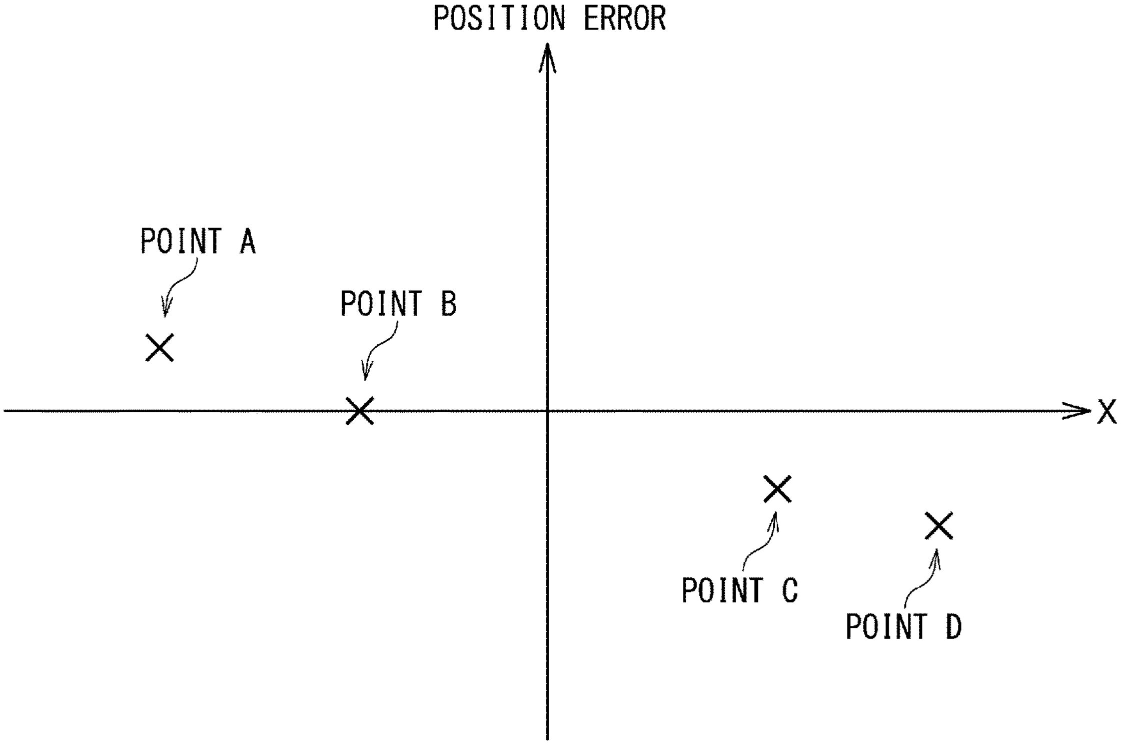
FIG. 10 is a diagram showing an example of a graph in which errors are plotted.

FIG. 10 shows an example of a graph in which errors at the four contact positions are plotted. The horizontal axis represents an error measured on the X axis, and the vertical axis represents an error measured on the Z axis. Here, the origin of the X axis indicates the center position of the workpiece 62 in the X-axis direction. In the example shown in FIG. 10, a position error at the contact point A is a positive value, and position errors at the contact points C, D are negative values. The position error is expressed by (measured coordinate value-design coordinate value), the positive position error means that the measured coordinate value is greater than the design coordinate value, and the negative position error means that the measured coordinate value is less than the design coordinate value.

Figure 11:
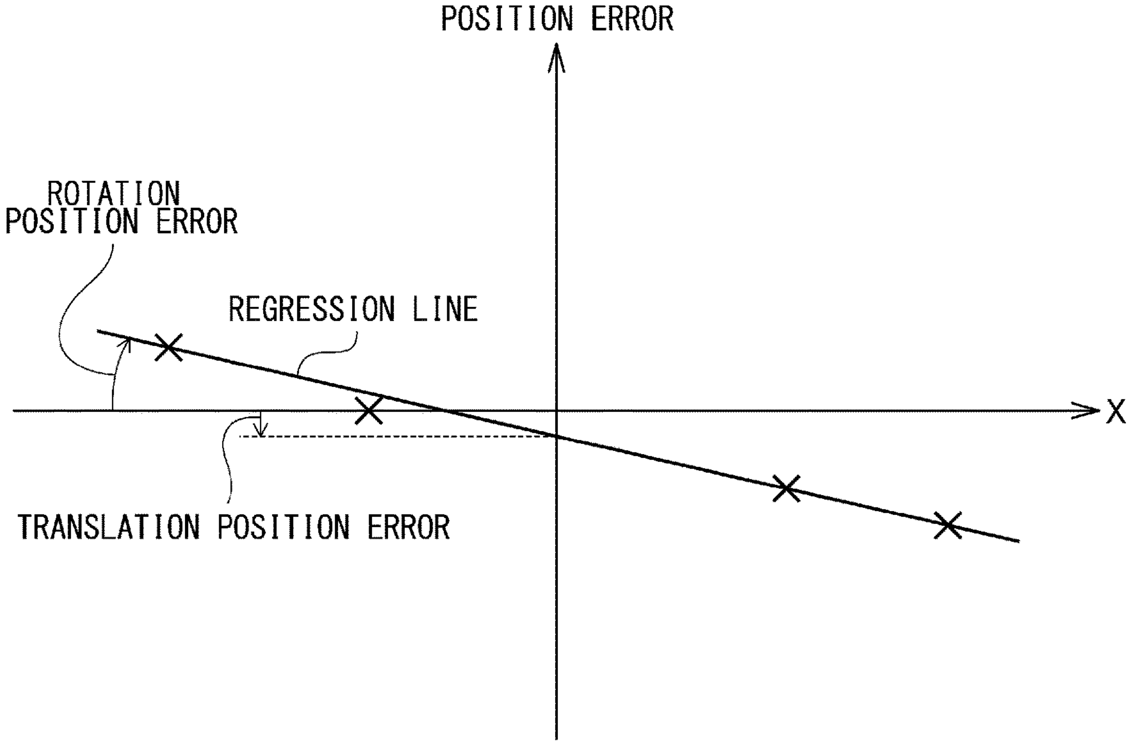
FIG. 11 is a diagram showing an example of derived rotation position errors and translation position errors.

FIG. 11 shows an example of a rotation position error and a translation position error derived from a plurality of position errors. From a relationship between the X-coordinate value and the position error at the plurality of contact points, the positional relationship measurer 116 calculates a regression line that minimizes the sum of squares of differences from the position error at each contact point. The positional relationship measurer 116 calculates a rotation position error that is an error in the rotation direction about the rotation axis as a slope of the regression line, and derives a translation position error at any X coordinate value. In the example shown in FIG. 11, a translation position error at the center position of the workpiece 62 in the X-axis direction is derived.

The output processor 118 outputs information on the rotation position error and/or the translation position error. For example, the operator can manually adjust the rotation position and translation position of the workpiece 62 with reference to the information on the rotation position error and the translation position error presented to the operator. Note that, when the rotation position is actually corrected, it is necessary to determine the rotation center. The output processor 118 may determine, as the rotation center, for example, an average position of coordinates of a plurality of contact points or an average position (midpoint) of two points (in this example, the point A and the point D) farthest from each other in the X-axis direction. After obtaining the rotation center position, the output processor 118 may obtain a translation position error at the center position from the regression line.

Fourth Example

In addition to the contents described in the third example, in a fourth example, the movement controller 112 moves the cutting tool 50 in the Z-axis negative direction to bring the cutting tool 50 into contact with the workpiece surface at a plurality of positions spaced apart from each other in the Y-axis direction that is a radial direction centered on the B-axis different from the radial direction in the third example. The positional relationship measurer 116 may identify a rotation position error about the A axis in addition to a translation position error in the Z-axis direction and a rotation position error about the B axis through multiple regression analysis from the relationship between the Y-coordinate value and the position error at the plurality of contact points and the relationship between the X-coordinate value and the position error at the plurality of contact points acquired in the third example.

Fifth Example

Figure 12:
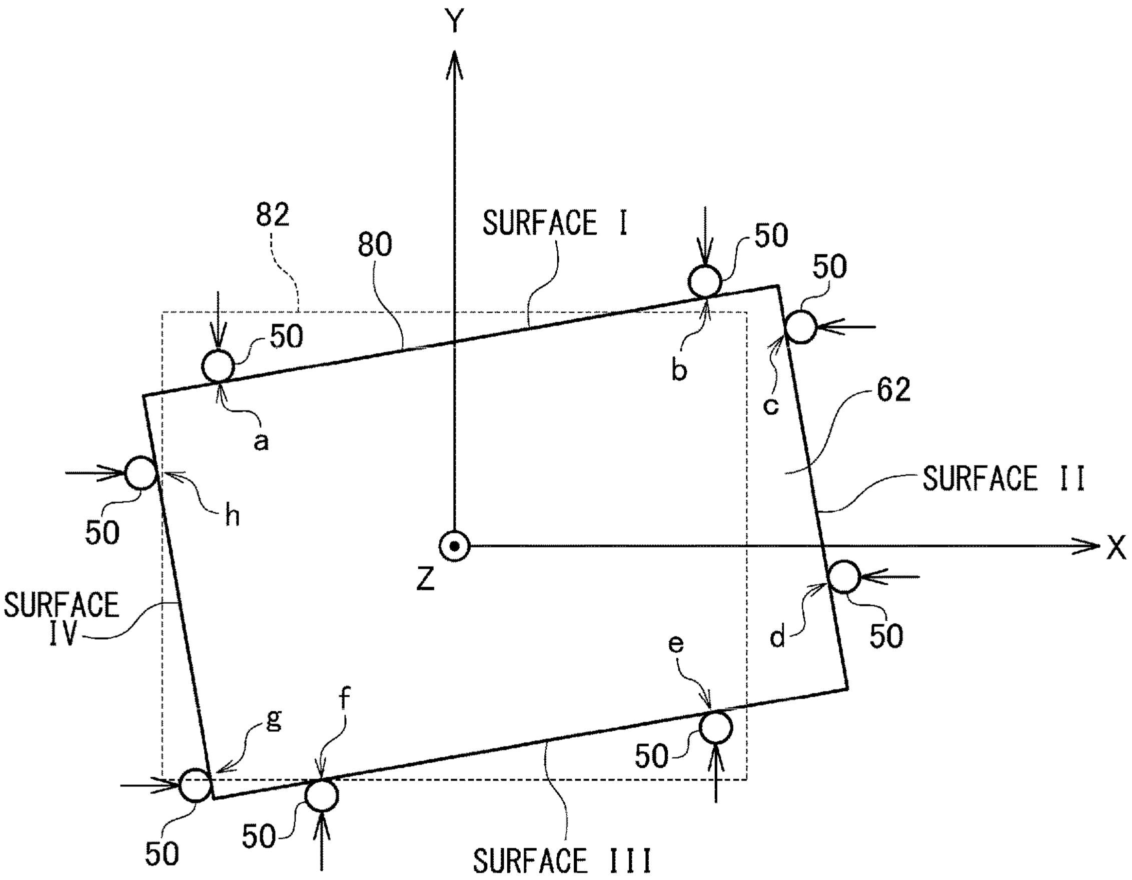
FIG. 12 is a diagram for describing an example of the measurement method.

FIG. 12 is a diagram for describing a measurement method according to a fifth example. A shape indicated by a solid line represents an actual surface shape 80 of the workpiece 62, and a shape indicated by a dotted line represents a design shape 82 of the workpiece 62 placed at a predetermined attachment position.

In the fifth example, the movement controller 112 moves the cutting tool 50 in two translation directions (the X-axis direction and the Y-axis direction) to bring the cutting tool 50 into contact with the surface of the workpiece 62. In this example, for convenience of description, the workpiece 62 has four surfaces I to IV, and the cutting tool 50 is moved in a translation direction approximately perpendicular to each surface. The movement controller 112 moves the cutting tool 50 in the Y-axis negative direction to bring the cutting tool 50 into contact with the surface I, moves the cutting tool 50 in the X-axis negative direction to bring the cutting tool 50 into contact with the surface II, moves the cutting tool 50 in the Y-axis positive direction to bring the cutting tool 50 into contact with the surface III, and moves the cutting tool 50 in the X-axis positive direction to bring the cutting tool 50 into contact with the surface IV.

The movement controller 112 brings the cutting tool 50 into contact with each surface at a plurality of positions spaced apart from each other in a direction orthogonal to the movement direction and the Z-axis direction. The movement controller 112 brings the cutting tool 50 into contact with the surfaces I, III at a plurality of positions spaced apart from each other in the X-axis direction, and brings the cutting tool 50 into contact with the surfaces II, IV at a plurality of positions spaced apart from each other in the Y-axis direction. In the example shown in FIG. 12, the cutting tool 50 comes into contact with the surface I at points a, b, comes into contact with the surface II at points c, d, comes into contact with the surface III at points e, f, and comes into contact with the surface IV at points g, h. The cutting tool 50 may come into contact with each surface at three or more points.

The contact detector 114 measures and acquires coordinate values of the reference point when the workpiece 62 and the cutting tool 50 come into contact with each other at the plurality of positions, and the positional relationship measurer 116 derives a position error obtained by subtracting the design coordinate value of the reference point from the measured coordinate value acquired at the plurality of contact positions. The positional relationship measurer 116 may simultaneously identify a translation position error in two translation directions (the X-axis direction and the Y-axis direction) and a rotation position error about the rotation axis (the C-axis) on the basis of the position errors at the plurality of contact positions.

Figure 13:
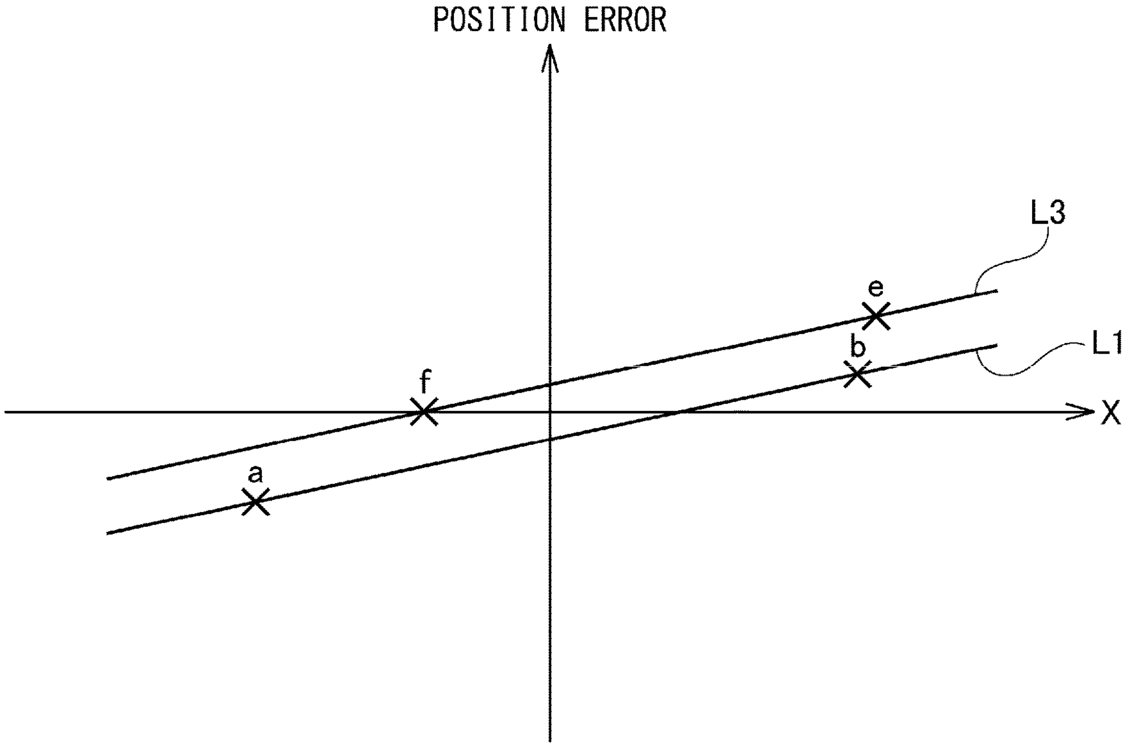
FIG. 13 is a diagram showing an example of a regression line.

FIG. 13 shows an example of a regression line derived on the basis of position errors on the surface I and the surface III. Since the cutting tool 50 is moved in the Y-axis direction to the surface I and the surface III, the horizontal axis is set to the X-axis orthogonal to the Y-axis and the rotation axis (C-axis). The vertical axis represents an error measured on the Y-axis that is the movement direction. The positional relationship measurer 116 calculates, on the basis of the relationship between the X-coordinate value and the position error at each of the plurality of contact points a, b on the surface I, a regression line L1 that minimizes the sum of squares of differences from the position error at each contact point. Further, the positional relationship measurer 116 calculates, on the basis of the relationship between the X-coordinate value and the position error at each of the plurality of contact points e, f on the surface III, a regression line L3 that minimizes the sum of squares of differences from the position error at each contact point. As described with reference to FIG. 11, the positional relationship measurer 116 derives the rotation position error and the translation position error in the Y-axis direction of the surface I from the regression line L1, and derives the rotation position error and the translation position error in the Y-axis direction of the surface III from the regression line L3. In FIG. 13, the fact that the translation position error of the surface I is relatively smaller than the translation position error of the surface III indicates that the actual dimension of the workpiece 62 in the Y-axis direction is smaller than a corresponding design value, and the difference between the translation position errors corresponds to a shape error in the Y-axis direction.

Figure 14:
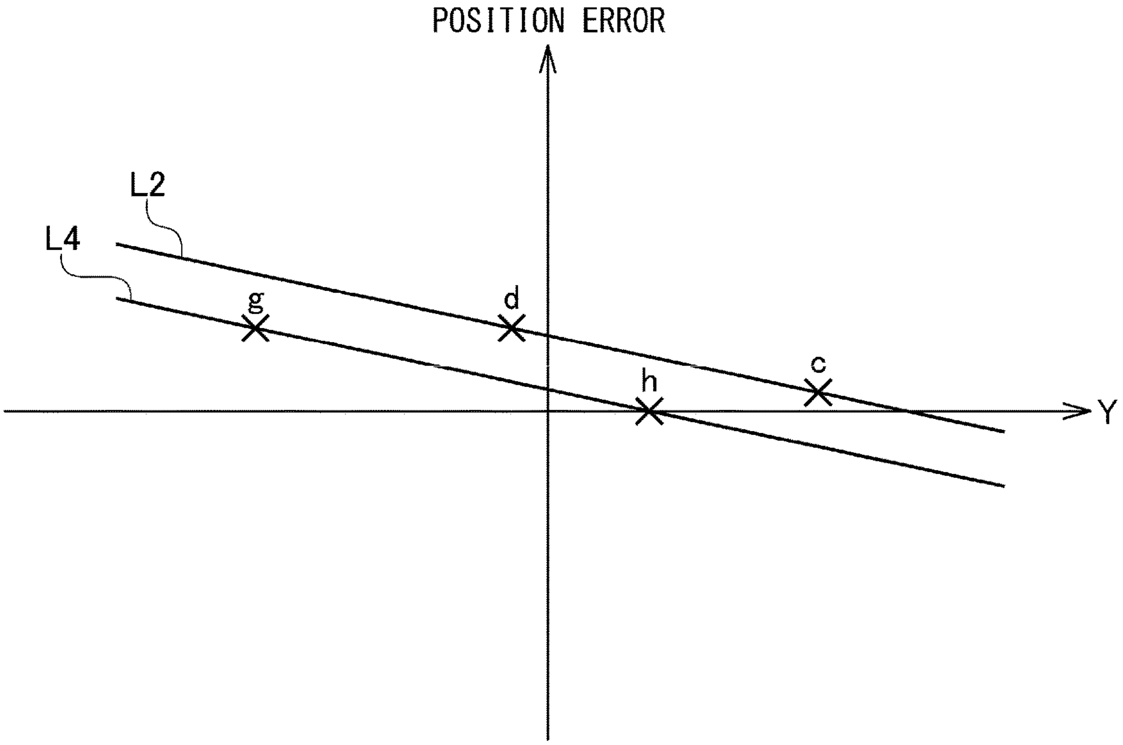
FIG. 14 is a diagram showing an example of a regression line.

FIG. 14 shows an example of a regression line derived on the basis of the position errors on the surface II and the surface IV. Since the cutting tool 50 is moved in the X-axis direction to the surface II and the surface IV, the horizontal axis is set to the Y-axis orthogonal to the X-axis and the rotation axis (C-axis). The vertical axis represents an error measured on the X-axis that is the movement direction. The positional relationship measurer 116 calculates, on the basis of the relationship between the Y-coordinate value and the position error at each of the plurality of contact points c, d on the surface II, a regression line L2 that minimizes the sum of squares of differences from the position error at each contact point. Further, the positional relationship measurer 116 calculates, on the basis of the relationship between the Y-coordinate value and the position error at each of the plurality of contact points g, h on the surface IV, a regression line L4 that minimizes the sum of squares of differences from the position error at each contact point. As described with reference to FIG. 11, the positional relationship measurer 116 derives the rotation position error and the translation position error in the X-axis direction of the surface II from the regression line L2, and derives the rotation position error and the translation position error in the X-axis direction of the surface IV from the regression line L4. In FIG. 14, the fact that the translation position error of the surface II is relatively larger than the translation position error of the surface IV indicates that the actual dimension of the workpiece 62 in the X-axis direction is larger than a corresponding design value, and the difference between the translation position errors corresponds to a shape error in the X-axis direction.

The positional relationship measurer 116 may identify the translation position error of each surface and the common rotation position error by calculating a common regression equation that is the same in slope (however, the slope is positive for the surfaces I, III, and the slope is negative for the surfaces II, IV) but different in vertical axis shift amount (in a common regression equation used in analysis of covariance and the like, the slope is either positive or negative, and therefore it should be noted that this point is different from the normal common regression equation) for the position errors at the plurality of contact positions a to h.

As described above, in the fifth example, the translation position error, the rotation position error, and the shape error can be separately and simultaneously identified by statistically analyzing the errors at the plurality of contact positions.

The measurement methods described in the first to fifth examples may be performed individually, or two or more measurement methods may be performed in sequence or in parallel. For example, when the techniques described in the fourth example and the fifth example are each applied to identify a position error in the ZAB direction and a position error in the XYC direction, position errors in all the six axes (three translation axes and three rotation axes) of the workpiece surface can be identified. Measuring position errors at many contact points allows a dimensional error and a shape error of the workpiece surface (when information on the tool is not sufficiently accurate, such errors are relative values to the tool) to be identified simultaneously.

Using such pieces of information, the operator can manually adjust the attachment position of the workpiece 62 or set an appropriate machining allowance for a finishing process. The control device 100 can also automatically shift the machining position, change the machining allowance, correct the machining shape and dimensions to avoid generation of an unmachined portion, or reduce the cut amount using an offset amount of the work coordinate system, a macro variable of the NC program, or the like.

Note that the surface to which the workpiece 62 is secured may be a reference surface that has been subjected to the finishing process. In such a case, when the shape and dimensions after machining are important, a higher priority is given to the shape and dimensions after machining over avoiding generation of an unmachined portion and reducing the cut amount, and the tool information (shape, dimensions, attachment position) is more accurate than the information on the workpiece 62 (shape, dimensions), correction such as shifting the machining position, changing the machining allowance, or modifying the machining shape or dimensions in accordance with the shape of the workpiece 62 is not made for the rotation directions about the two translation axes included in the reference surface and the translation position (dimension) from the reference surface. This is because a dimensional error or a shape error of the machined surface relative to the reference surface occurs when such corrections are made. With the above applied to the example shown in FIG. 9 and described in the third example, when the bottom surface (parallel to the XY plane) of the workpiece 62 serves as the reference surface, a correction in the AB-axis direction and the Z-axis direction is not made, for example, a correction in the C-axis direction and the XY-axis direction (correction of the fixing position or offset of the machining position) is made on the basis of the information obtained by the technique described in the fifth example, an appropriate cutting start position is set on the basis of the information obtained in the fourth example, and it is possible to confirm whether there is no unmachined portion.

On the other hand, when the surface to which the workpiece 62 is secured is a surface before being subjected to the finishing process, or when a higher priority is given to avoiding generation of an unmachined portion or reducing the cut amount over the shape and dimensions after machining, the information on the workpiece (shape, dimensions) may be more accurate than the information on the tool (shape, dimensions, attachment position) (for example, in a case where each dimension is measured using an accurate cuboid or cylindrical shape). In such a case, it is possible to shift the machining position, change the machining allowance, or modify the machining shape or dimensions in accordance with the shape of the workpiece 62 for the rotation directions about the two translation axes included in the fixing surface and the translation position (dimension) from the fixing surface.

Sixth Example

Figure 15B:
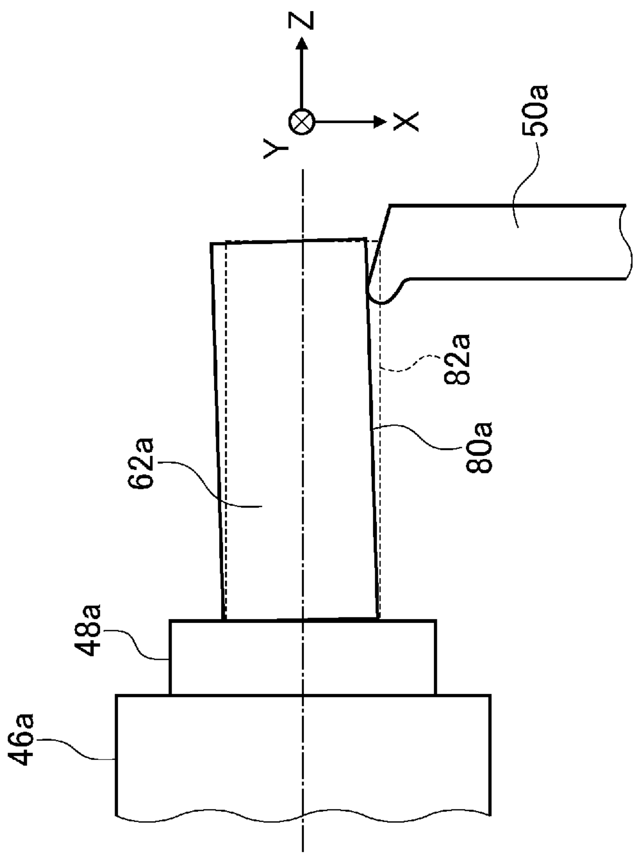
FIGS. 15A and 15B are diagrams for describing an example of the measurement method.
Figure 15A:
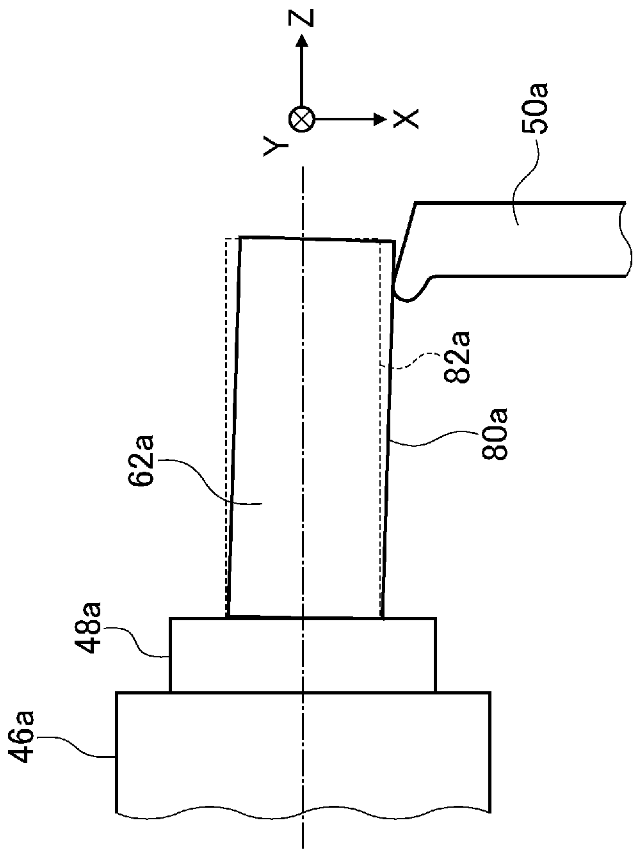

FIGS. 15A and 15B are diagrams for describing a measurement method according to a sixth example. The sixth example relates to a turning machine tool, and a workpiece 62*a* is attached to a chuck 48*a* secured to a spindle 46*a*. A shape indicated by a solid line represents an actual surface shape 80*a* of the workpiece 62*a*, and a shape indicated by a dotted line represents a design shape 82*a* of the workpiece 62*a* placed at a predetermined attachment position. A cutting tool 50*a* is a tool used for a turning process, and the reference point may be set at any position of the cutting edge.

In the sixth example, the movement controller 112 moves the cutting tool 50*a* in one translation direction (X-axis negative direction) to bring the cutting edge of the cutting tool 50*a* into contact with the surface of the workpiece 62*a* that is not rotating. The movement controller 112 moves the cutting tool 50*a* to bring the cutting tool 50*a* into contact with the workpiece 62*a* at a plurality of different rotation positions of the spindle 46*a*, and the contact detector 114 measures and acquires coordinate values of the reference point when the workpiece 62*a* and the cutting tool 50*a* come into contact with each other at the plurality of different rotation positions of the spindle 46*a*.

Specifically, after bringing the cutting tool 50*a* into contact with the workpiece 62*a*, the movement controller 112 moves the cutting tool 50*a* away from the workpiece 62*a*, the spindle controller 110 rotates, from the rotation position of the spindle 46*a* at this time, the spindle 46*a* by N degrees about the axis, and then the movement controller 112 brings the cutting tool 50*a* into contact with the workpiece 62*a* again. As described above, before this contact, the spindle controller 110 rotates the spindle 46*a* by N degrees about the axis from the rotation position of the spindle 46*a* at the previous contact, and the movement controller 112 may bring the cutting tool 50*a* into contact with the workpiece 62*a* at the plurality of different rotation positions of the spindle 46*a*. The movement controller 112 may bring the workpiece 62*a* and the cutting tool 50*a* into contact with each other at least (360/N) times while changing the rotation position of the spindle 46*a*. Here, the rotation angle N is set such that (360/N) results in an integer.

The positional relationship measurer 116 calculates a position error obtained by subtracting the design coordinate value of the reference point intended for machining from the measured coordinate value at the plurality of contact positions. In the sixth example, the X-coordinate value included in the design coordinate value is one predetermined value regardless of the rotation position of the spindle 46.

Figure 16:
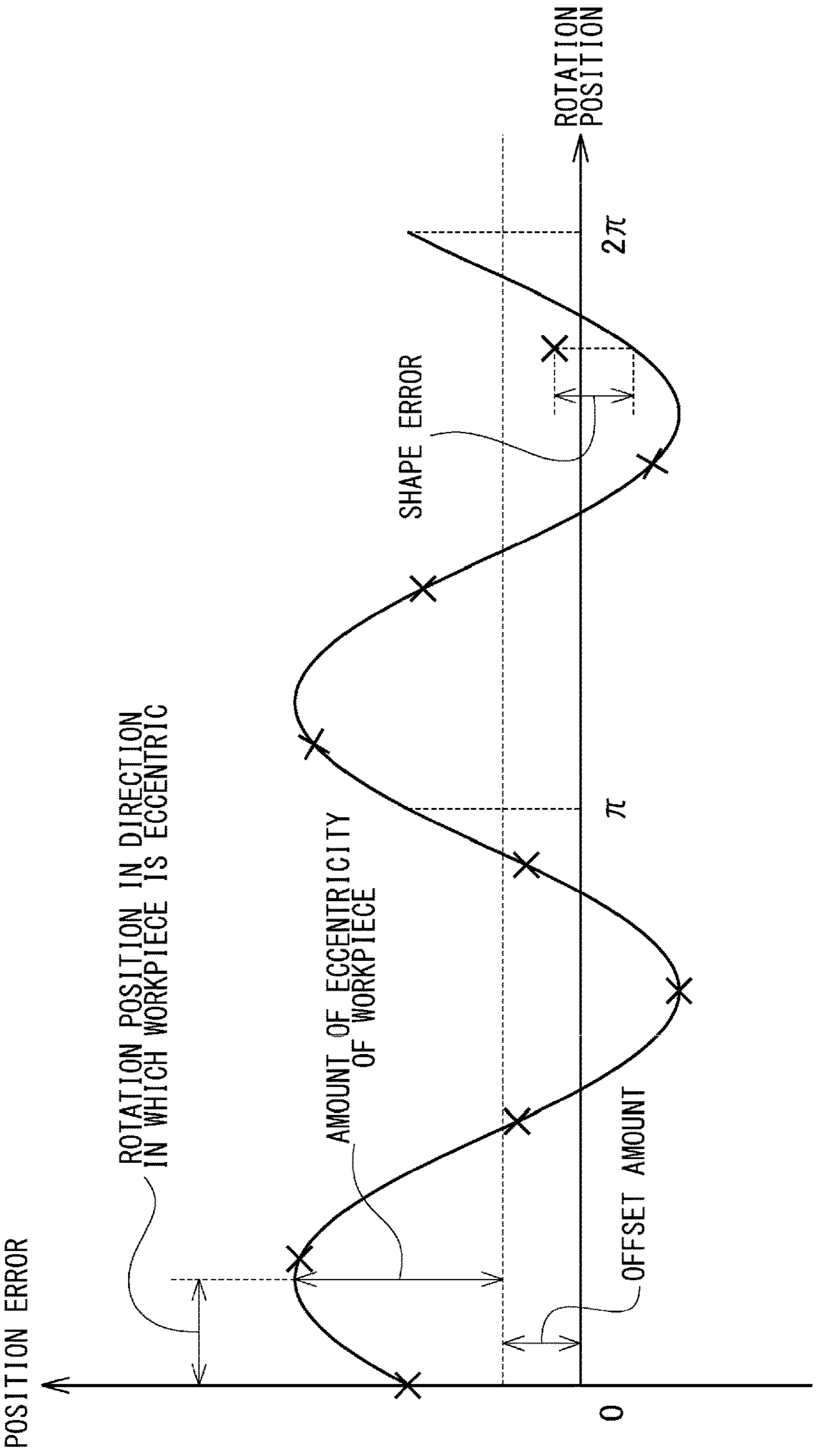
FIG. 16 is a diagram showing information derived from a plurality of position errors.

FIG. 16 is a diagram showing information derived from a plurality of position errors. In a graph in which the horizontal axis represents a rotation position and the vertical axis represents a position error measured in the X-axis direction, the positional relationship measurer 116 plots, at a corresponding rotation position, the position error at each of the plurality of contact positions. A cross mark shown in FIG. 16 indicates a measured value of each position error. The positional relationship measurer 116 derives a sine wave that fits the plurality of position errors.

In this sine wave, the amplitude and the phase correspond to an amount of eccentricity of the workpiece 62*a*, and an angle position of the workpiece 62*a*, respectively, the offset amount corresponds to a radius error, and the deviation of each position error from the sine wave corresponds to a shape error of the workpiece surface. When the same measurement is performed on a side surface of the workpiece at other axial positions, and the same measurement is performed by bringing an end surface into contact at a plurality of rotation positions and a plurality of radial positions in the axial direction as necessary, information such as a translation component and an angle component of the deviation between the rotation axis and the center axis of the workpiece 62*a*, a protruding amount, and a shape error can be obtained. On the basis of such pieces of information, the operator may manually correct an attachment error, determine a machining allowance, or may create a program for correcting the translation component and the angle component of the deviation (eccentricity) of the workpiece center axis from the rotation axis by controlling the X-axis position in synchronization with the C-axis.

In the embodiment, for convenience of description, under one measurement method, the number of directions of the contact motion is up to two directions (four directions when including positive and negative directions), and the number of directions of the fixing position and the shape error of the workpiece to be identified is up to three directions (the number of combinations of the translation direction and the rotation direction). However, the directions of the contact motion can include three orthogonal directions and an infinite number of directions in a range of the three orthogonal directions, the workpiece attachment error (fixing position) can be identified in up to six-axis (three translation-axis and three rotation-axis) directions that are the maximum degree of freedom in the space, and errors in dimension and shape of the workpiece surface can be identified in up to the same number of directions as the directions of the contact motion. In the embodiment, the regression analysis or the common regression equation is used as an example of the statistical processing, but the statistical processing is not limited to such an example, and the identification may be performed so as to make the error smaller as a whole (for example, to make the absolute value of the error or the sum of squares smaller, minimize as the optimum value), and various numerical analysis methods such as a steepest descent method, a random method, and a neighborhood search method may be used.

The present disclosure has been described on the basis of the embodiment. It is to be understood by those skilled in the art that the embodiments are illustrative and that various modifications are possible for a combination of components or processes, and that such modifications are also within the scope of the present disclosure.

The outline of an aspect of the present disclosure is as follows. A positional relationship measurement method according to one aspect of the present disclosure includes moving a tool relative to a workpiece to bring the workpiece and the tool into contact with each other, acquiring a coordinate value of a reference point when the workpiece and the tool come into contact with each other, deriving an error between the coordinate value thus acquired and a design coordinate value of the reference point at a position where the workpiece and the tool come into contact with each other, and outputting information on the error.

According to this aspect, it is possible to perform the setup with high accuracy by outputting the information on the error between the actual measured coordinate value and the design coordinate value.

In the moving, the workpiece and the tool may be brought into contact with each other at a plurality of positions, in the acquiring a coordinate value, a coordinate value of the reference point when the workpiece and the tool come into contact with each other at each of the plurality of positions may be acquired, and in the deriving an error, an error at each of the plurality of contact positions may be derived. In the outputting, information on an error obtained by subtracting a corresponding design coordinate value of the reference point in a movement direction from the coordinate value acquired in the movement direction, the error being smallest or largest, may be output.

In the outputting, information on an average value of the errors in the movement direction at the plurality of contact positions may be output. In the moving, the workpiece and the tool may be brought into contact with each other at a plurality of positions spaced apart from each other in one translation direction that is a radial direction centered on a rotation axis, and in the outputting, information on an error in the one translation direction and information on an error in a rotation direction about the rotation axis may be output.

In the moving, the tool may be relatively moved in two translation directions to come into contact with the workpiece at a plurality of positions, and in the outputting, information on an error in the two translation directions and information on an error in one rotation direction may be output. In the moving, the workpiece and the tool may be brought into contact with each other at different rotation positions of a spindle, in the acquiring a coordinate value, a coordinate value of the reference point when the workpiece and the tool come into contact with each other at each of the different rotation positions of the spindle may be acquired, in the deriving an error, an error at each of the plurality of contact positions may be derived, and in the outputting, information on an amount of eccentricity of the workpiece may be output.

A machining apparatus according to another aspect of the present disclosure includes a rotation mechanism structured to rotate a spindle to which a tool is attached, a feed mechanism structured to move the tool relative to a workpiece, and a control device structured to control rotation of the spindle by the rotation mechanism and relative movement of the tool by the feed mechanism. The control device moves the tool relative to the workpiece to acquire a coordinate value of a reference point when the workpiece and the tool come into contact with each other, derives an error between the coordinate value thus acquired and a design coordinate value of the reference point at a position where the workpiece and the tool come into contact with each other, and outputs information on the error.

What is claimed is:

1. A positional relationship measurement method for measuring a relative positional relationship between a workpiece and a tool, the method comprising:

moving the tool relative to the workpiece to bring the workpiece and the tool into contact with each other;

acquiring a coordinate value of a reference point when the workpiece and the tool come into contact with each other;

deriving an error between the coordinate value acquired and a design coordinate value of the reference point at a position where the workpiece and the tool come into contact with each other; and outputting information on the error, wherein in the moving, the workpiece and the tool are brought into contact with each other at the plurality of positions spaced apart from each other in one translation direction that is a radial direction centered on a rotation axis, in the acquiring the coordinate value, a plurality of coordinate values of the reference point when the workpiece and the tool come into contact with each other at the plurality of positions are acquired, in the deriving the error, a plurality of the errors at the plurality of contact positions are derived, and in the outputting, information on the error in the translation direction and information on the error in a rotation direction about the rotation axis are output.

2. A positional relationship measurement method for measuring a relative positional relationship between a workpiece and a tool, the method comprising:

moving the tool relative to the workpiece to bring the workpiece and the tool into contact with each other;

acquiring a coordinate value of a reference point when the workpiece and the tool come into contact with each other;

deriving an error between the coordinate value acquired and a design coordinate value of the reference point at a position where the workpiece and the tool come into contact with each other; and outputting information on the error, wherein in the moving, the tool is relatively moved in two translation directions to come into contact with the workpiece at the plurality of positions, in the acquiring the coordinate value, a plurality of coordinate values of the reference point when the workpiece and the tool come into contact with each other at the plurality of positions are acquired, in the deriving the error, a plurality of the errors at the plurality of contact positions are derived, and in the outputting, information on the errors in the two translation directions and information on the error in one rotation direction are output.

* * * * *